(12) United States Patent
Ishibashi

(10) Patent No.: US 7,734,920 B2
(45) Date of Patent: Jun. 8, 2010

(54) INFORMATION PROCESSING APPARATUS, INFORMATION PROCESSING METHOD, INFORMATION PROVIDING MEDIUM, INFORMATION DECRYPTION APPARATUS, AND INFORMATION RECORDING MEDIUM

(75) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1036 days.

(21) Appl. No.: 11/447,260

(22) Filed: Jun. 6, 2006

(65) Prior Publication Data

US 2006/0236107 A1    Oct. 19, 2006

Related U.S. Application Data

(63) Continuation of application No. 09/410,788, filed on Oct. 1, 1999, now Pat. No. 7,127,612.

(30) Foreign Application Priority Data

Oct. 2, 1998    (JP)    ................. 10-281087

(51) Int. Cl.
*H04L 9/00* (2006.01)
*G06F 11/00* (2006.01)

(52) U.S. Cl. ............... 713/169; 713/170; 713/193; 380/281; 380/284; 726/7; 726/27

(58) Field of Classification Search .............. 713/169, 713/170, 193; 380/281, 284; 726/7, 27
See application file for complete search history.

(56) References Cited

U.S. PATENT DOCUMENTS

| 4,799,061 A | 1/1989 | Abraham et al. |
| 5,758,069 A | 5/1998 | Olsen |
| 6,421,779 B1 | 7/2002 | Kuroda et al. |

FOREIGN PATENT DOCUMENTS

| JP | 05-075598 | 3/1993 |
| JP | 6-289782 | 10/1994 |
| JP | 07-123086 | 5/1995 |

(Continued)

OTHER PUBLICATIONS

Efficient and Secure Remote Authenticated Key Agreement Scheme for Multi-server Using Mobile Equipment; Jun Ho Lee; Dong Hoon Lee; Consumer Electronics, 2008. ICCE 2008. Digest of Technical Papers. International Conference on Jan. 9-13, 2008 pp. 1-2.*

(Continued)

*Primary Examiner*—David Y Jung
(74) *Attorney, Agent, or Firm*—Finnegan, Henderson, Farabow, Garrett & Dunner, LLP

(57) ABSTRACT

An information processing apparatus, an information processing method, and an information providing medium are provided. Encrypted information, an encrypted first key for decrypting the encrypted information, and a second key for decrypting the first key are processed to store the information in a storage medium. To be more specific, cross certification is executed with the storage medium, the first key is decrypted by the second key, the decrypted first key is encrypted, and the decrypted first key and the encrypted information are stored in the storage medium. The novel constitution prevents unauthorized replication of information by use of a low-cost, general-purpose semiconductor memory.

54 Claims, 10 Drawing Sheets

FOREIGN PATENT DOCUMENTS

JP    08-186667    7/1996

OTHER PUBLICATIONS

A technique to build a secret key in integrated circuits for identification and authentication applications; Lee, J.W.; Daihyun Lim; Gassend, B.; Suh, G.E.; van Dijk, M.; Devadas, S.; VLSI Circuits, 2004. Digest of Technical Papers. 2004 Symposium on Jun. 17-19, 2004 pp. 176-179.*

Intellectual property authentication by watermarking scan chain in design-for-testability flow; Aijiao Cui; Chip-Hong Chang; Circuits and Systems, 2008. ISCAS 2008. IEEE International Symposium on May 18-21, 2008 pp. 2645-2648.*

Office Action issued by Japan Patent Office in Japanese Patent Application No. JP 10-281087 on Nov. 25, 2008 (3 pages).

* cited by examiner

F I G. 7
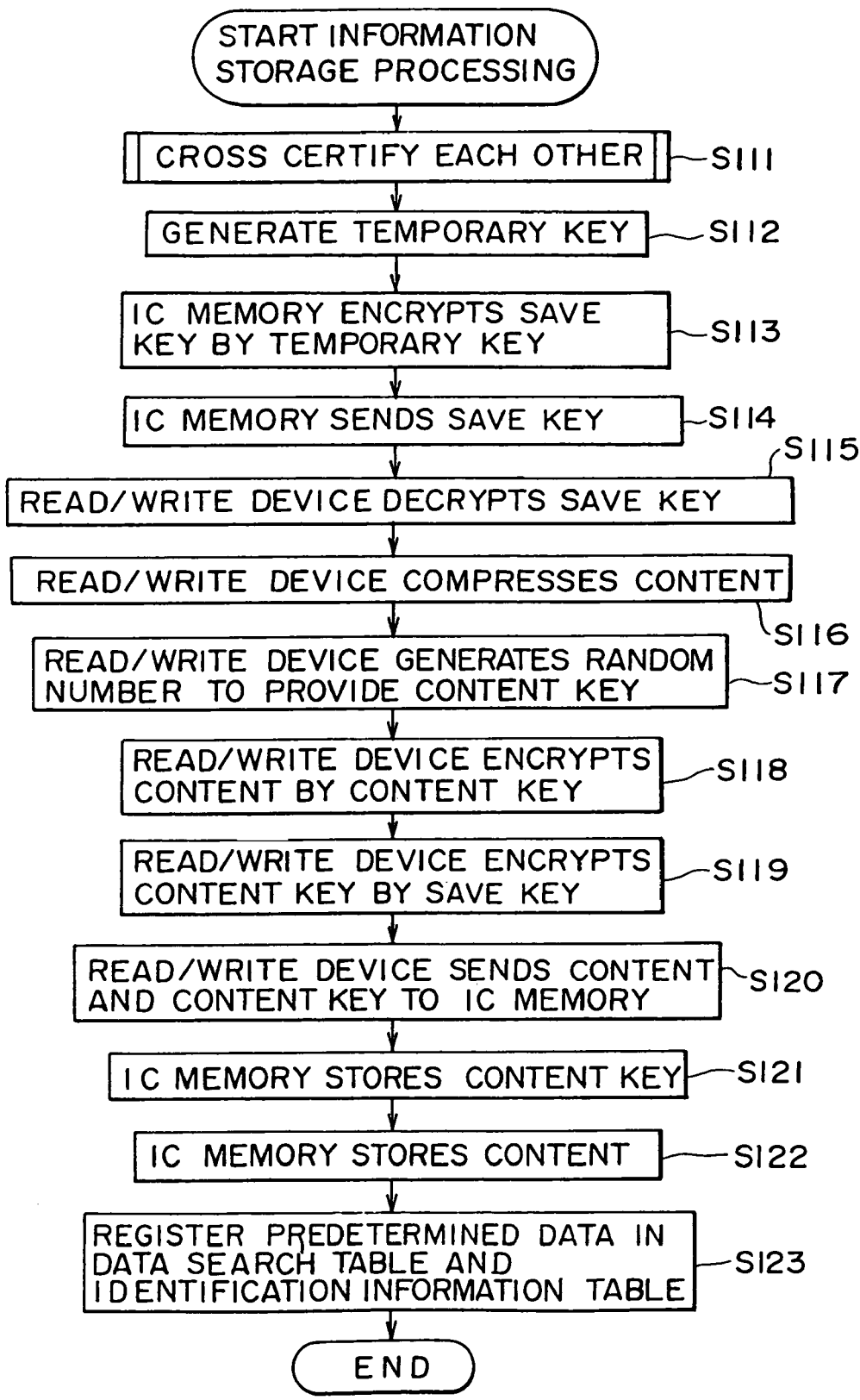

INFORMATION PROCESSING APPARATUS, INFORMATION PROCESSING METHOD, INFORMATION PROVIDING MEDIUM, INFORMATION DECRYPTION APPARATUS, AND INFORMATION RECORDING MEDIUM

This is a continuation of U.S. patent application Ser. No. 09/410,788, filed Oct. 1, 1999 now U.S Pat. No. 7,127,612, the contents of which are incorporated herein by reference. Application Ser. No. 09/410,788 claims priority to Japanese Application No. 10-281087, filed Oct. 2, 1998.

BACKGROUND OF THE INVENTION

The present invention relates generally to an information processing apparatus, an information processing method, an information decryption apparatus, an information decryption method, an information providing medium, and an information storage medium. More particularly, the present invention relates to an information processing apparatus, an information processing method, an information decryption apparatus, an information decryption method, an information providing medium, and an information storage medium that encrypt information for recording.

Conventional information processing apparatuses for reading and writing information on an information recording medium such as an FD (Floppy Disc), a CD-R (Compact Disc Recordable), a DVD-RAM (Digital Versatile Disc Random Access Memory), or an MD (Mini Disc: trade mark) have no capability of encoding information for recording. Therefore, to encrypt information for recording, information encrypted in advance must be supplied to these information processing apparatuses.

The above-mentioned information encoding is intended to fail attempts of unauthorized duplication or access of information, so that previously encoding information cannot prevent the same from unauthorized duplication. This is because, if an encoding program or a decoding program has been supplied as a program to be executed on a PC (Personal Computer) for example, replicating this program and distributing the replicate program allows unauthorized users to replicate encrypted information as it is and decrypt the replicated information by use of the distributed program.

If an encoding program or a decoding program is supplied as firmware of information processing apparatuses, the information itself recorded on an information recording medium can be easily replicated and preparing the information processing apparatus in which the firmware is installed allows use of replicated information.

To solve this problem, information may be stored in a special memory, for example a semiconductor memory with its reading sequence or the like kept confidential. Unless the reading sequence is known, no information can be read from such a memory.

However, use of the above-mentioned special semiconductor memory requires a predetermined circuit for handing the reading sequence. This makes such a semiconductor memory less general-purpose, increasing its fabrication cost.

SUMMARY OF THE INVENTION

It is therefore an object of the present invention to prevent unauthorized replicating of information by use of a low-cost, general-purpose semiconductor memory.

In carrying out the invention and according to one aspect thereof, there are provided an information processing apparatus, an information processing method, and an information providing medium that process encrypted information, an encrypted first key for decrypting the encrypted information, and a second key for decrypting the first key and store the information in a storage medium. To be more specific, cross certification is executed with the storage medium, the first key is decrypted by the second key, the decrypted first key is encrypted, and the decrypted first key and the encrypted information are sent to the storage medium.

In carrying out the invention and according to another aspect thereof, there are provided an information processing apparatus, an information processing method, and an information providing medium that store information in a loaded storage medium. To be more specific, cross certification is executed with the storage medium, a first key for encrypting information is generated, the information is encrypted by the first key, the first key is then encrypted, and the encrypted information and the encrypted first key are sent to the storage medium.

In carrying out the invention and according to still another aspect thereof, there is provided a storage medium that stores information supplied from an information processing apparatus and an encrypted first key for decrypting that information. To be more specific, cross certification is executed with the information processing apparatus, a temporary key is shared, the first key encrypted by a temporary key in the information processing apparatus is received, the first key is decrypted, the decrypted first key is encrypted by a previously stored save key, and the encrypted first key and the encrypted information are stored.

BRIEF DESCRIPTION OF THE DRAWINGS

These and other objects of the invention will be seen by reference to the description, taken in connection with the accompanying drawing, in which:

FIG. 7 is a flowchart describing still another type of the processing for storing content received through network;

DETAILED DESCRIPTION OF PREFERRED EMBODIMENTS

This invention will be described in further detail by way of example with reference to the accompanying drawings.

In order to clarify the correlation between the means of the invention described in claims appended hereto and the components of the embodiment of the invention, each of the means is followed by parentheses in which an example of the corresponding component of the embodiment is enclosed. However it should be noted that each of the above means are not restricted to those described below.

Figure 1:
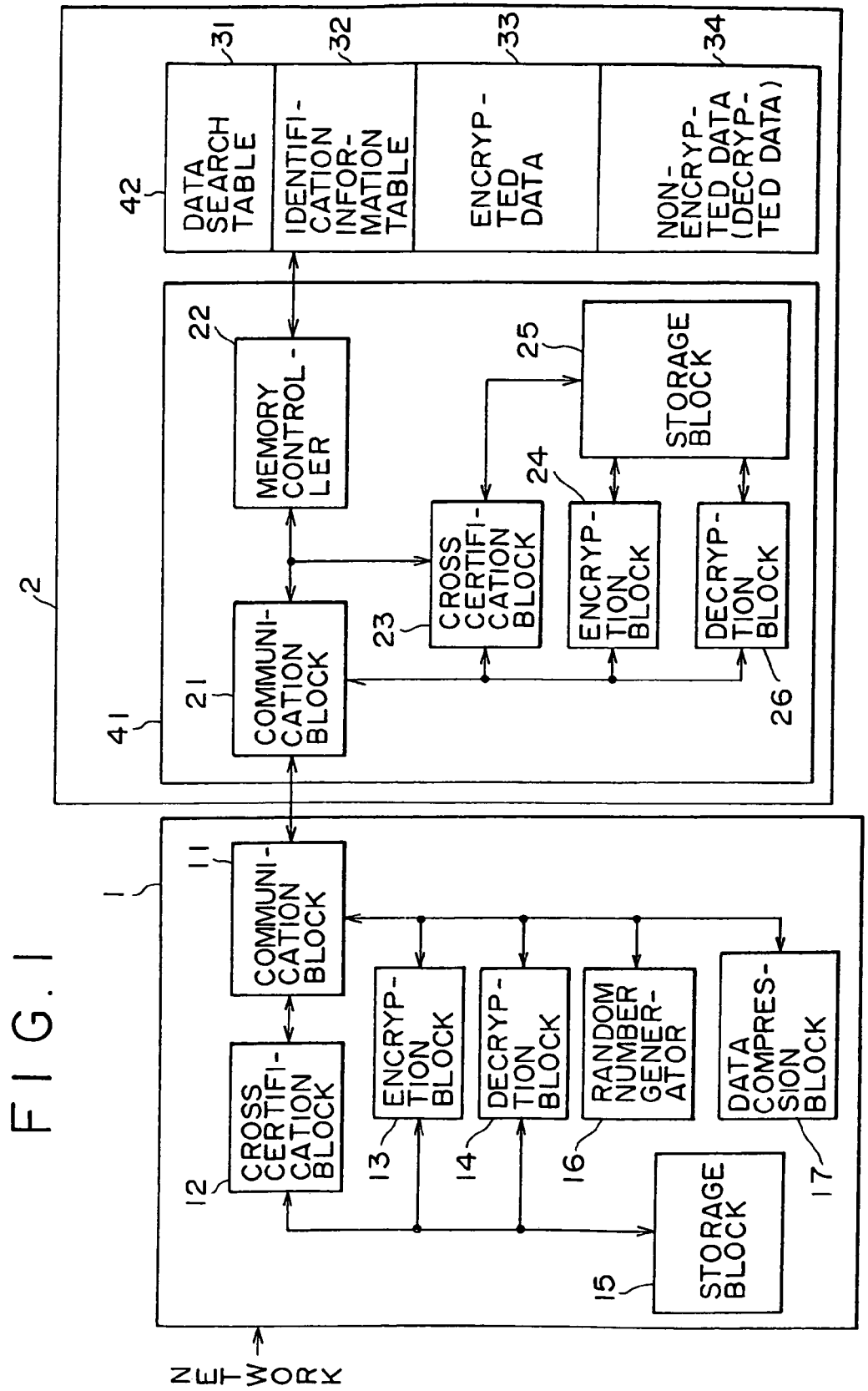
FIG. 1 is a block diagram illustrating constitutions of an information processing apparatus and an information storage medium practiced as one preferred embodiment of the invention.

Now, referring to FIG. 1, a read/write device 1 is connected to a network to write information (hereafter referred to as content) such as music, a still picture, a motion picture, and a computer game program into a loaded IC (Integrated Circuit) memory 2 and read the content therefrom. A communication block 11 transmits content or encrypted content key Kco to be described later to the IC memory 2 and receives content or encrypted content key Kco from the IC memory 2. A cross certification block 12 executes cross certification through a cross certification block 23 of the IC memory 2 and cross-certification processing to be described later and, after completion of cross certification, generates a temporary key Ktemp to be used for a predetermined period of time in the communication with the IC memory 2.

An encryption block 13 encrypts the content supplied through the network or the key (hereafter referred to as a content key Kco) necessary for decrypting the content by use of a predetermined method such as DES Data Encryption Standard), which is a common-key cryptographic scheme, and supplies the encrypted content or the encrypted content key to the communication block 11.

DES is a cryptographic scheme that uses a 56-bit common key to process 64 bits of plaintext as one block. The DES processing is made up of a portion in which plaintext is stirred to encrypt the same into ciphertext (this portion is referred to as a data hashing portion) and a portion in which a key (extended key) to be used in the data hashing portion is generated from the common key (this portion is referred to as a key processing portion). All algorithms of DES are made public, so that the basic processing of the data hashing portion will be outlined below.

First, 64 bits of plaintext is divided into high-order 32 bits $H_0$, and low-order 32 bits $L_0$. A value to be obtained by hashing the low-order 32 bits $L_0$ by F function is calculated from a 48-bit extended key $K_1$ supplied from the key processing portion and the low-order 32 bits $L_0$. F function is constituted by two basic conversions; "substitution" in which numeric values are replaced by a predetermined rule and "transposition" in which bit positions are replaced by a predetermined rule. Next, the high-order 32 bits $H_0$ is exclusive-ORed with the output of F function, a result thereof providing low-order 32 bits $L_1$. The low-order 32 bits $L_0$ provides high-order 32 bits $H_1$.

On the basis of the high-order 32 bits $H_0$ and the low-order 32 bits $L_0$, the above-mentioned processing is repeated 16 times, resultant high-order 32 bits $H_{16}$ and low-order 32 bits $L_{16}$ being outputted as ciphertext. Decryption is realized by following the above-mentioned procedure in reverse order by use of the common key used for encryption.

A decryption block 14 decrypts the content and the content key Kco by use of a predetermined scheme such as DES, a common-key cryptographic scheme. A storage block 15 stores a delivery key Kd and so on for decrypting the content key Kco supplied through the network and supplies the delivery key Kd and so on to the encryption block 13 or the decryption block 14. A random number generator 16 generates random numbers having the predetermined number of digits for use as the content key Kco and so on. A data compression block 17 compresses the content supplied through the network by means of a predetermined scheme such as ATRAC (Adaptive Transform Acoustic Coding), MP3 (MPEG-1 Audio Layer 3), or AAC (MPEG-2 Advanced Audio Coding) and supplies the compressed content to the encryption block 13.

The IC memory 2 loaded in the read/write device 1 for storing content is made up of a control block 41 for controlling storage of content and so on and an information storage block 42 for actually storing content and so on. The control block 41 is constituted by a single-chip IC dedicated to cryptographic processing having a multilayer structure. Memory cells in this IC are sandwiched between dummy layers such as aluminum layers. This IC has a narrow operating voltage or frequency width. These features make this IC tamper proof, preventing external unauthorized access to the data stored in the IC.

The control block 41 comprises a communication block 21, a memory controller 22, the cross certification block 23, an encryption block 24, a storage block 25, and a decryption block 26. The communication block 21 receives content or an encrypted content key Kco and so on from the read/write device 1 and transmits content or encrypted content key Kco and so on to the read/write device 1. The memory controller 22 writes the content or encrypted content key Kco and so on received by the communication block 21 onto the information storage block 42 and reads the contents and so on stored in the information storage block 42 to supply them to the communication block 21. The cross certification block 23 cross-certifies with the cross certification block 12 of the read/write device 1 by means of cross certification processing to be described later. After completion of the cross certification, the cross certification block 23 generates a temporary key Ktemp to be used for a predetermined period of time in the communication with the read/write device 1.

The encryption block 24 once encrypts the content key Kco decrypted by the decryption block 26 by a save key Ksave and supplies the encrypted content key to the memory controller 22. The decryption block 26 decrypts the content key Kco encrypted by the temporary key Ktemp or the content key Kco encrypted by the save key Ksave and supplies the decrypted content key to the encryption block 24 or the communication block 21. The storage block 25 stores the save key Ksave having a value unique to the IC memory 2 (the value being different for each IC memory 2) and supplies the save key Ksave to the encryption block 24 or the decryption block 26.

The information storage block 42 is constituted by a general-purpose nonvolatile memory such as an EEPROM (Electrically Erasable Programmable Read Only Memory), a flash memory, or a ferroelectric memory capable of rewriting its contents electrically. This storage block stores a data search table 31, an identification information table 32, encrypted data 33, and non-encrypted data 34. The data search table 31 stores the contents of the information stored as encrypted data 33 and the non-encrypted data 34 and data indicative of the storage locations of these contents. The identification information table 32 stores data indicative of whether the contents of stored information are encrypted or not. For the encrypted data 33, the encrypted content, the content key Kco, and so on are stored. For the non-encrypted data 34, information about usage license of content not encrypted is stored.

Figure 2:
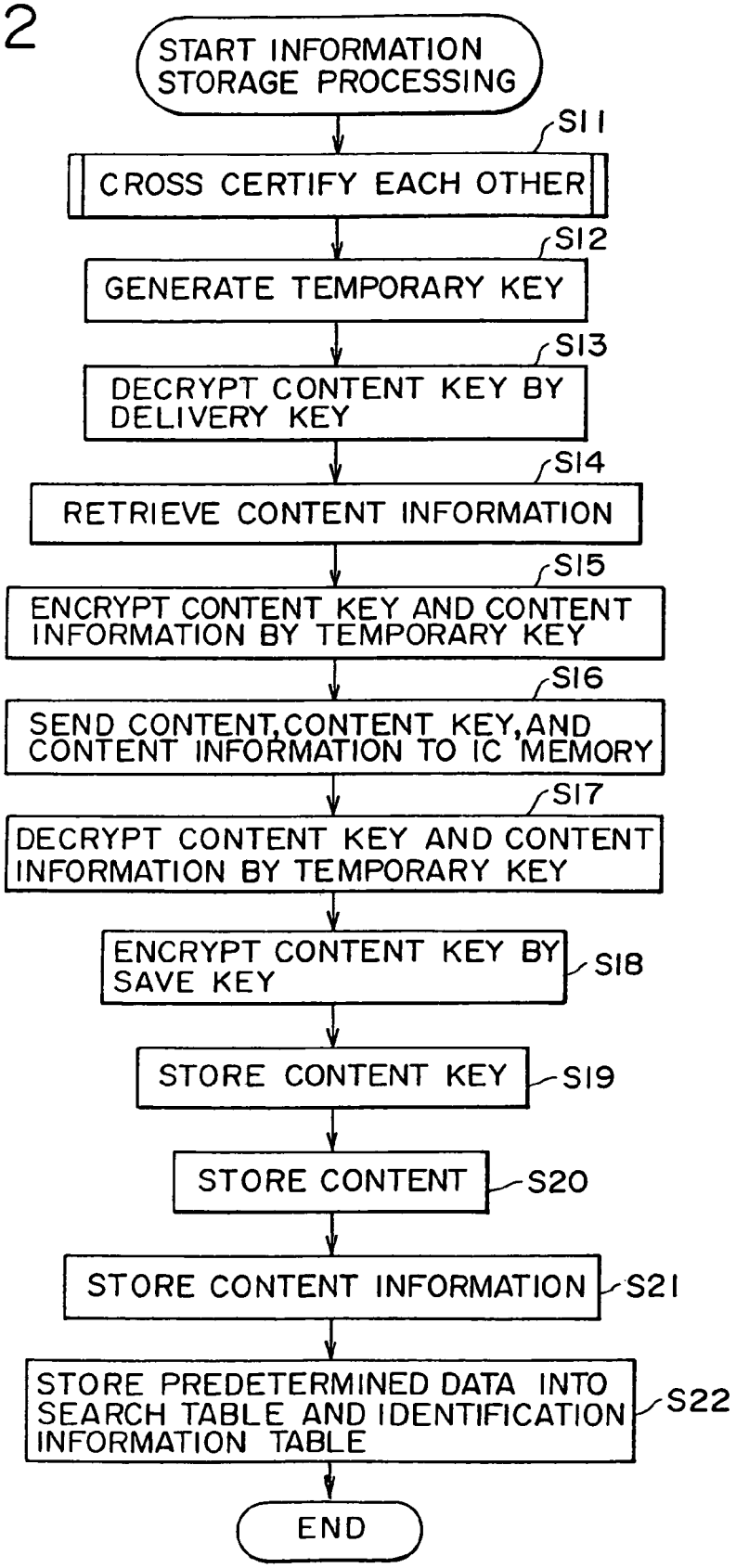
FIG. 2 is a flowchart describing the processing for storing content and content key Kco received through a network.

FIG. 2 is a flowchart indicative of processing in which, when the read/write device 1 receives the content encrypted by a content key Kco and the content key Kco encrypted by a delivery key Kd through the network, the read/write device 1 sends these pieces of information to the IC memory 2, which stores the received information. In steps S11 and S12, the cross certification block 12 of the read/write device 1 cross-certifies the cross certification block 23 of the IC memory 2 and shares a temporary key Ktemp (for example, coherence R2∥R3 shown in steps S42 and S45 of FIG. 3 to be described later). The details of this processing will be described with reference to FIG. 3. The shared temporary key Ktemp is stored by the storage block 15 and the storage block 25. In step S13, the decryption block 14 of the read/write device 1 receives in advance through the network the content key Kco encrypted by the delivery key Kd received through the network and, by use of the delivery key Kd stored in the storage block 15, decrypts the received content key Kco by means of a common-key cryptographic scheme such as DES. In step S14, the decryption block 14 decrypts content information received through the network encrypted along with the content key Kco by the delivery key Kd and extracts the decrypted content information. The content information herein denotes usage license information, billing information, and usage count for example associated with that content.

In step S15, the encryption block 13 encrypts, by the temporary key Ktemp shared in step S11, the content key Kco and content information decrypted in step S14. In step S16, the communication block 11 sends the content encrypted by the content key Kco, the content key Kco encrypted by the temporary key Ktemp, and the content information encrypted by the temporary key Ktemp to the communication block 21 of the IC memory 2. The communication block 21 of the IC memory 2 receives these items of information.

In step S17, the decryption block 26 of the IC memory 2 decrypts, by the temporary key Ktemp shared in step S11, the content key Kco encrypted by the temporary key Ktemp and the content information encrypted by the temporary key Ktemp. In step S18, the encryption block 24 of the IC memory 2 encrypts the encryption block 24 of the IC memory 2 encrypts, by the save key Ksave stored in the storage block 25 in advance, the content key Kco decrypted in step S17. In step S19, the memory controller 22 stores, at a predetermined location in the information storage block 42, the content key Kco encrypted by the save key Ksave as encrypted data 33. In step S20, the memory controller 22 stores, at a predetermined location in the information storage block 42, the content encrypted by the content key Kco as encrypted data 33.

In step S21, the memory controller 22 stores, at a predetermined location in the information storage block 42, the content information decrypted in step S17 as the non-encrypted data 34. In step S22, the memory controller 22 stores in the data search table 31 the information indicative of the storage locations of the content, the content key Kco, and the content information and stores the information in the identification information table 32 the information indicative of whether each of the content, the content key Kco, and the content information is encrypted or not.

Thus, the read/write device 1 encrypts the content and the information associated therewith as required and stores the encrypted content and information into the IC memory 2. It should be noted that, as described above, the content information includes, but not exclusively, usage license information, billing information, and usage count information for example.

Figure 3:
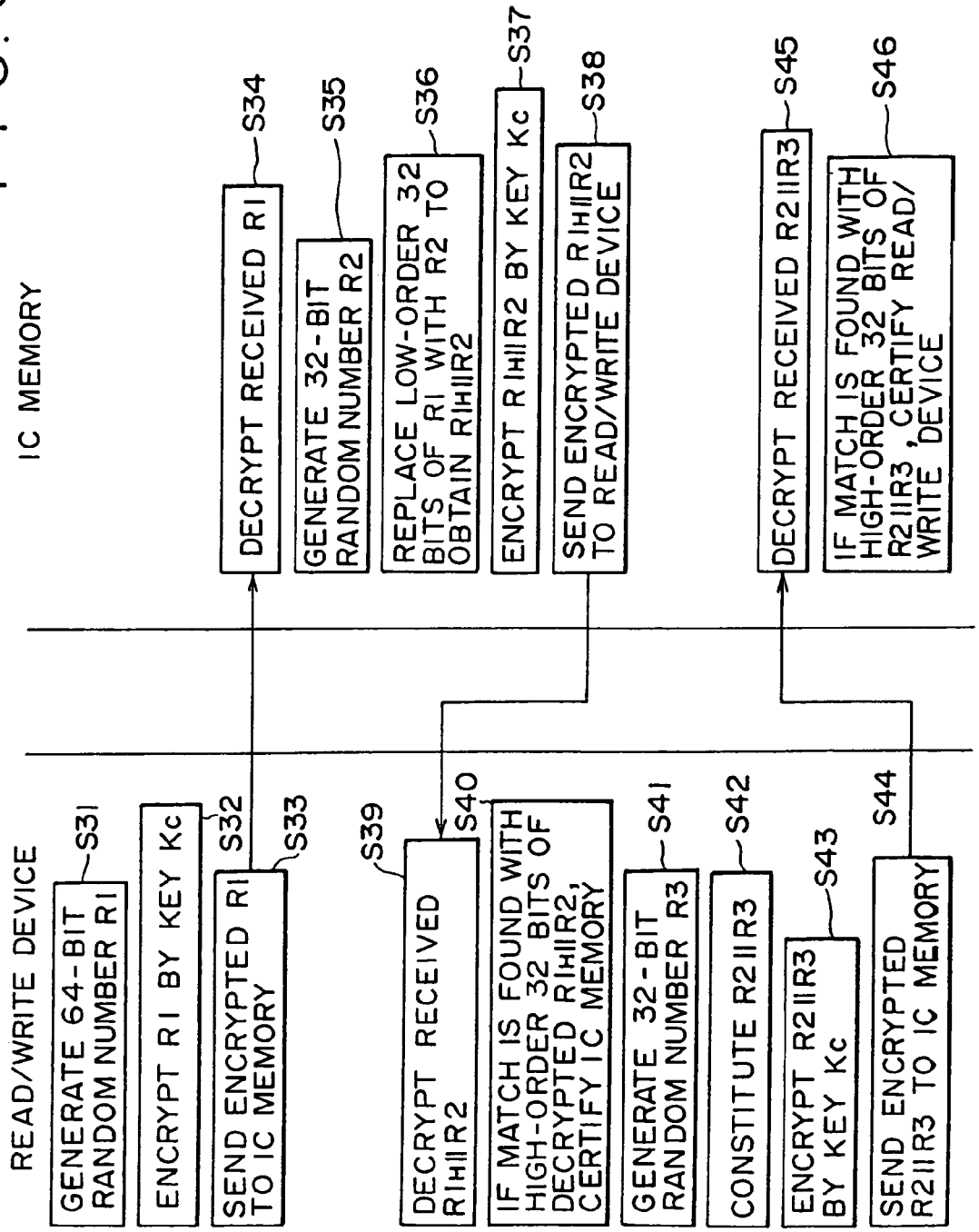
FIG. 3 is a flowchart describing the processing of cross certification to be executed when using two keys in common key cryptography.

FIG. 3 is a flowchart for describing the operation of the cross certification between the cross certification block 12 of the read/write device 1 and the cross certification block 23 of the IC memory 2, the operation using DES, a common-key cryptographic scheme using one common key, which corresponds to step S11 of FIG. 2. In step S31, the cross certification block 12 of the read/write device 1 generates a 64-bit random number R1 (the random number may also be generated by the random number generator 16). In step S32, the cross certification block 12 of the read/write device 1 encrypts the random number R1 by a common key Kc stored in the storage block 15 in advance (the encryption may also be made by the encryption block 13). In step S33, the cross certification block 12 of the read/write device 1 sends the encrypted random number R1 to the cross certification block 23 of the IC memory 2 through the communication block 11.

In step S34, the cross certification block 23 of the IC memory 2 decrypts the received random number R1 by the common key Kc stored in the storage block 25. In step S35, the cross certification block 23 of the IC memory 2 generates a 32-bit random number R2. In step S36, the cross certification block 23 of the IC memory 2 substitutes the low-order 32 bits of the 64-bit random number R1 decrypted in step S34 with the random number R2 to generate a coherence $R1_H\|R2$. It should be noted that $Ri_H$ represents the high-order bits of Ri and A∥B represents coherence between A and B (the low-order bits of n-bit A are connected to m-bit B, providing (n+m) bits). In step S37, the cross certification block 23 of the IC memory 2 encrypts the coherence $R1_H\|R2$ by the common key Kc. In step S38, the cross certification block 23 of the IC memory 2 sends the encrypted coherence $R1_H\|R2$ to the read/write device 1 through the communication block 21.

In step S39, the cross certification block 12 of the read/write device 1 decrypts the received coherence $R1_H\|R2$ by the common key Kc. In step S40, the cross certification block 12 of the read/write device 1 checks the high-order 32 bits $R1_H$ of the decrypted $R1_H\|R2$. If this $R1_H$ is found matching with the high-order 32 bits $R1_H$ of the random number R1 generated in step S31, the IC memory 2 is certified as authorized and valid memory. If no match is found between the generated $R1_H$ and the received R1, the processing comes to an end.

If both match each other, then, in step S41, the cross certification block 12 of the read/write device 1 generates a 32-bit random number R3. In step S42, the cross certification block 12 of the read/write device 1 sets the received and decrypted 32-bit random number R2 to the high-order and the generated random number R3 to the low-order, thereby generating a coherence R2∥R3. In step S43, the cross certification block 12 of the read/write device 1 encrypts the coherence R2∥R3 by the common key Kc. In step S44, the cross certification block 12 of the read/write device 1 sends the encrypted coherence R2∥R3 to the cross certification block 23 of the IC memory 2.

In step S45, the cross certification block 23 of the IC memory 2 decrypts, by the common key Kc, the coherence R2∥R3 received through the communication block 21. In step S46, the cross certification block 23 of the IC memory 2 checks the decrypted coherence R2∥R3. If the high-order 32 bits of this coherence are found matching with the random number R2 generated in step S35, the read/write device 1 is certified authorized and valid. If no match is found, the read/write device 1 is certified invalid, upon which the processing comes to an end.

Thus, the cross certification block 23 of the IC memory 2 and the cross certification block 12 of the read/write device 2 cross-certify each other. The random number coherence R2∥R3 used in the cross certification is used as a temporary key Ktemp which is valid only for the processing succeeding this cross certification.

Figure 4:
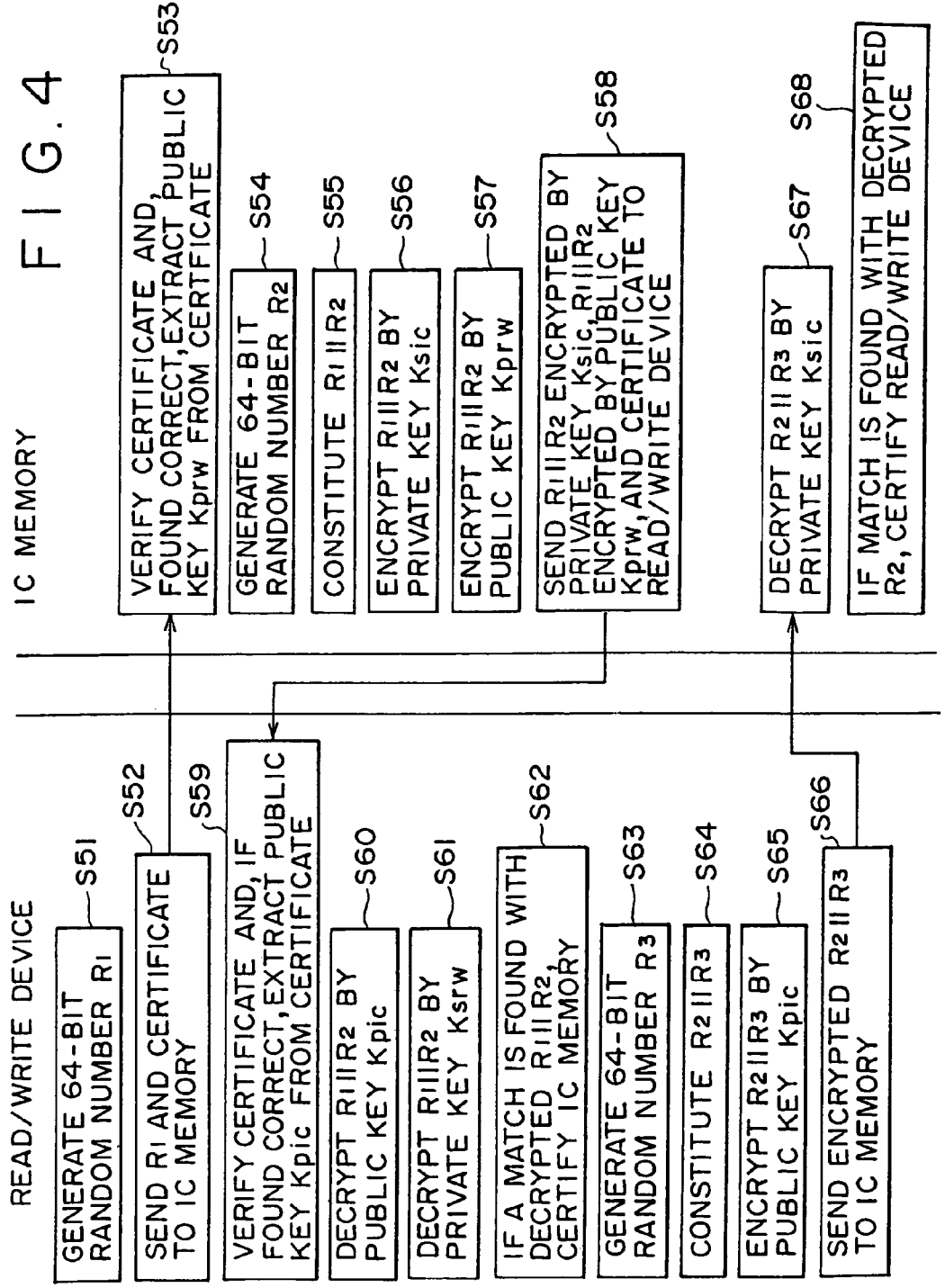
FIG. 4 is a flowchart describing the processing of cross certification to be executed when using public key cryptography.

FIG. 4 is a flowchart for describing the operation of the cross certification between the cross certification block 12 of the read/write device 1 and the cross certification block 23 of the IC memory 2, the operation being executed by use of 160-bit elliptic curve cryptosystem, a public key cryptosystem, corresponding to step S11 of FIG. 2. In step S51, the cross certification block 12 of the read/write device 1 generates a 64-bit random number R1. In step S52, the cross certification block 12 of the read/write device 1 sends to the cross certification block 23 of the IC memory 2 a certificate (obtained from a certificate authority) including the name of the read/write device 1, an own public key Kprw, and the signature of the certificate authority, and the random number R1.

The signature is attached to data or the certificate to be described later, thereby checking for data falsification and certifying a person who prepared the data. The signature is created by obtaining a hash value by a hash function on the basis of data to be sent and encrypting the obtained hash value by the private key of public key cryptography.

The following describes a hash function and signature matching. A hash function is a function in which predetermine data to be sent is used as an input, this data is compressed to a predetermined bit length, and the compressed data is outputted as a hash value. A hash function is characterized by that the input is difficult to predict from a hash value (output) and, as one bit of data inputted in the hash function changes, many bits of the hash value change. In addition, a hash function is characterized by the difficulty of searching for input data having a same hash value.

A receiving person who has received the signature and the data decrypts the received signature by the public key of public key cryptography to obtain its result (hash value). Further, the hash value of the received data is calculated to determine whether the calculated hash value is equal to the hash value obtained by signature decryption. If the hash value of the sent data is found equal to the decrypted hash value, it indicates that the received data has not been falsified and therefore the data has been sent from a person having a private key corresponding to the public key. The hash function for signature includes MD4, MD5, and SHA-1 for example.

The following describes public key cryptography. Unlike common key cryptography in which a same key (a common key) is used in encryption and decryption, public key cryptography uses different keys for encryption and decryption. Use of public key cryptography allows to keep one of the keys secret if the other is made public. The key that can be made public is referred to as a public key while the other key kept secret is referred to as a private key.

The following briefly describes elliptic curve cryptography, another example of public key cryptography. Let a point on elliptic curve $y^2=x^3+ax+b$ be B. Define the addition of points on the elliptic curve. nB represents a result obtained by adding B n times. Likewise, define subtraction. It has been proved that it is difficult to calculate n from B and nB. Let B and nB be public keys and n be a private key. By use of random number r, ciphertext C1 and ciphertext C2 are calculated from plaintext M by the public key on the basis of the processing operations of relations (1) and (2) as follows:

$$C1 = M + rnB \quad (1)$$

$$C2 = rB \quad (2)$$

The ciphertext C1 and the ciphertext C2 are decrypted by the processing of relation (3) into plaintext M as follows:

$$M = C1 - nC2 \quad (3)$$

Only a person who can decrypt the ciphertexts is a person who has a private key n. Thus, in elliptic curve cryptography, the different keys can be used for encryption and decryption.

The following briefly describes RSA (Rivest-Shamir-Adleman) cryptography, a representative one of public key cryptography. First, two large enough prime numbers p and q are obtained and a product between p and q is obtained. Lowest common multiple L of (p−1) and (q−1) is calculated. Then, value e which is 3 or more and less than L and mutually disjoint with L is obtained (namely, only 1 can commonly fully divide both e and L).

Next, multiplication inverse element d associated with a multiplication to modulus L. Namely, ed=1 mod L is established between d, e, and L, d being calculated by Euclidean algorithm. At this time, n and e provide public keys and p, q, and d provide private keys.

Ciphertext C is calculated from plaintext M by the processing of relation (4) as follow:

$$C = M^e \bmod n \quad (4)$$

Ciphertext C is decrypted into plaintext M by the processing of relation (5) as follow:

$$M = C^d \bmod n \quad (5)$$

That ciphertext encrypted by RSA cryptography can be decrypted is based on Fermat's minor theorem, although the proof is omitted, and the establishment of relation (6) as follows:

$$M = C^d = (M^e)^d = M^{(ed)} \bmod n \quad (6).$$

If private keys p and q are known in advance, private key d can be calculated from public key e. Increasing the number of digits of public key n to a degree at which factorization into prime factors is difficult in terms of computational quantify makes it impracticable to calculate private key d from public key e only by knowing public key n, thereby disabling decryption. Thus, like elliptic curve cryptography, RSA cryptography can also have different keys for encryption and decryption.

In step S53, the cross certification block 23 of the IC memory 2 decrypts the signature (encrypted by a private key Ksca of the certificate authority) of the received certificate by the previously obtained public key Kpca of the certificate authority and extracts the public key Kprw of the read/write device 1 stored therein as plaintext as well as the name of the read/write device 1. If the certificate is found valid as issued by the certificate authority, the signature of the certificate can be decrypted. The hash value of the public key Kprw obtained by encryption and the name (ID) of the read/write device 1 matches a hash value obtained by applying a hash function to the public key Kprw of the read/write device 1 stored therein as plaintext as well as the name (ID) of the read/write device 1. Thus, the public key Kpwr is certified valid. If the signature cannot be decrypted or if the signature can be decrypted but no match is found between the hash values, the public key is certified invalid or the read/write device is certified invalid, upon which this processing comes to an end.

If a valid certification result is obtained, then the cross certification block 23 of the IC memory 2 generates a 64-bit random number R2 in step S54. In step S55, the cross certification block 23 of the IC memory 2 generates coherence R1||R2 of random number R1 and random number R2. In step S56, the cross certification block 23 of the IC memory 2 encrypts coherence R1||R2 by its own private key Ksic. In step S57, the cross certification block 23 of the IC memory 2 encrypts coherence R1||R2 by the public key Kprw of the read/write device 1 obtained in step S53. In step S58, the cross certification block 23 of the IC memory 2 sends coherence R1||R2 encrypted by the private key Ksic, coherence R1||R2 encrypted by the public key Kprw, and the certificate (previously obtained from the certificate authority) including own public key Kpic to the cross certification block 12 of the read/write device 1.

In step S59, the cross certification block 12 of the read/write device 1 decrypts the signature of the received certificate by the previously obtained public key Kpca of the certificate authority and, if the signature is found valid, extracts the public key Kpic from the certificate. This processing is generally the same as that described in step S53, so that its details will be skipped. In step S60, the cross certification block 12 of the read/write device 1 decrypts, by the public key Kpic obtained in step S59, the coherence R1||R2 encrypted by the private key Ksic of the IC memory. In step S61, the cross certification block 12 of the read/write device 1 decrypts, by its own private key Ksrw, the coherence R1||R2 encrypted by its own public key Kprw. In step S62, the cross certification block 12 of the read/write device 1 compares the coherence R1||R2 decrypted in step S60 with the coherence R1||R2 decrypted in step S61. If a match is found, the IC memory 2 is certified valid; if not, the IC memory 2 is certified invalid, upon which this processing comes to an end.

If the IC memory 2 is certified valid, then the cross certification block 12 of the read/write device 1 generates a 64-bit random number R3 in step S63. In step S64, the cross certification block 12 of the read/write device 1 generates coherence R2||R3 of the random number R2 obtained in step S60 and the generated random number R3. In step S65, the cross certification block 12 of the read/write device 1 encrypts the coherence R2||R3 by the public key Kpic obtained in step S59. In step S66, the cross certification block 12 of the read/write device 1 sends the encrypted coherence R2||R3 to the cross certification block 23 of the IC memory 2.

In step S67, the cross certification block 23 of the IC memory 2 decrypts, by its own private key Ksic, the received encrypted coherence R2||R3. In step S68, the cross certification block 23 of the IC memory 2 compares the decrypted random number R2 with the random number R2 (before encryption) generated in step S54. If a match is found, the read/write device 1 is certified valid; if not, the read/write device 1 is certified invalid, upon which this processing comes to an end.

Thus, use of public key cryptography also allows cross certification between the cross certification block 23 of the IC memory 2 and the cross certification block 12 of the read/write device 1. Like common key cryptography, the coherence R2||R3 of random numbers used for cross certification is used as a temporary key Ktemp which is valid only the processing succeeding that cross certification.

Figure 5:
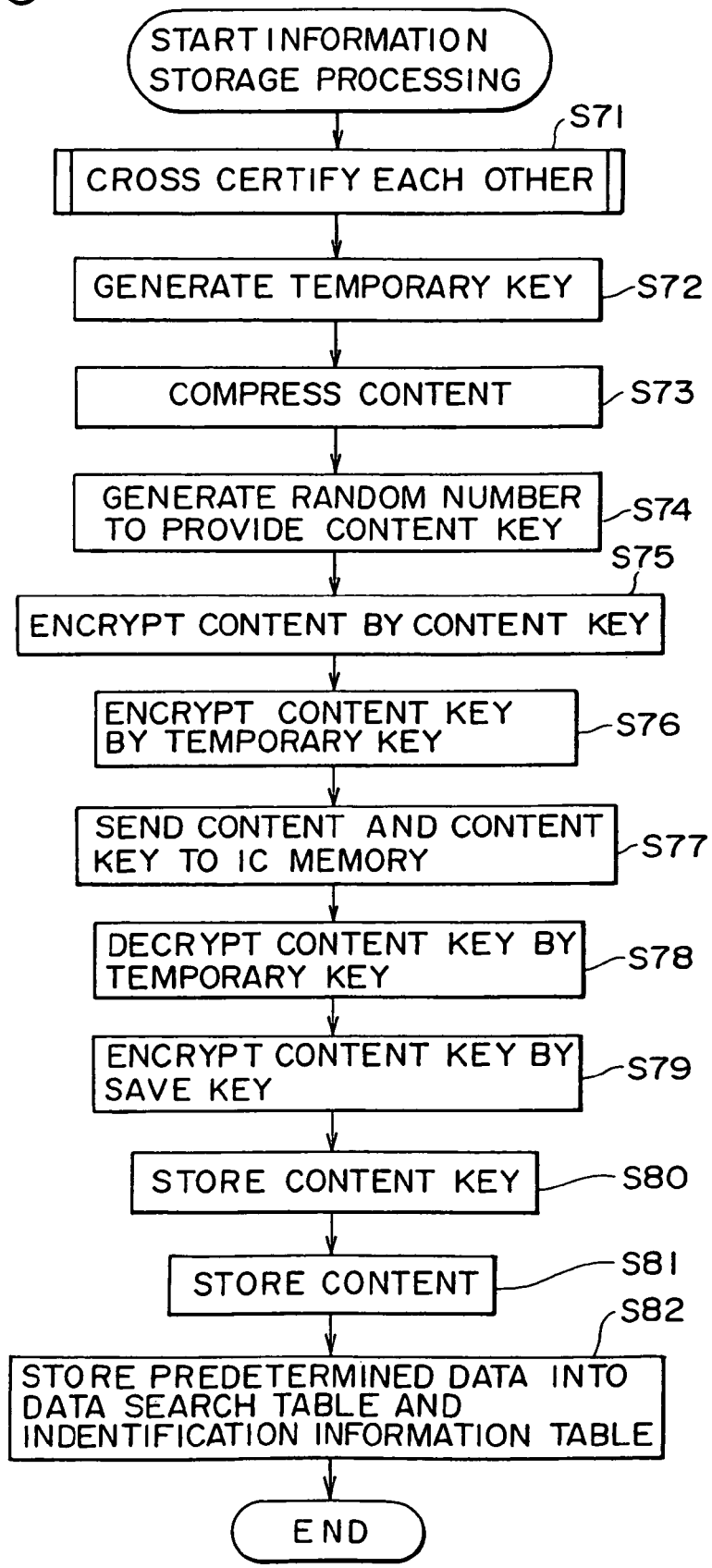
FIG. 5 is a flowchart describing the processing for compressing content received through network and stores the compressed content.

FIG. 5 is a flowchart describing the processing in which the read/write device 1 compresses plaintext content received through the network, encrypts the same by a generated content key Kco, encrypts the content key Kco by a temporary key Ktemp shared in the cross certification processing to be described later with reference to FIG. 3 or 4, and sends the content and the content key Kco to the IC memory 2, which stores the content encrypted by the content key Kco and the content key Kco encrypted by a save key Ksave. In step S71 and step S72, the cross certification 12 of the read/write device 1 cross-certifies the cross certification block 23 of the IC memory 2 to share the temporary key Ktemp. This cross certification processing is generally the same as that described with reference to FIGS. 3 and 4, so that its details will be skipped. The shared temporary key is stored in the storage block 15 and the storage block 25.

In step S73, the data compression block 17 compresses, by use of ATRAC or the like, the plaintext content received through the network. In step S74, the random number generator 16 generates a random number having a predetermined number of digits for use as a content key Kco and supplies the generated random number to the encryption block 13. In step S75, the encryption block 13 encrypts, by a predetermined cryptographic scheme such as DES, the content key Kco generated in step S74. In step S76, the encryption block 13 encrypts, by the temporary key Ktemp shared in step S71, the content key Kco by a predetermined cryptographic scheme such as DES. In step S77, the communication block 11 sends the encrypted content and the encrypted content key Kco to the communication block 21 of the IC memory 2, which receives the encrypted content and the encrypted content key Kco.

In step S78, the decryption block 26 of the IC memory 2 decrypts, by the temporary key Ktemp, the content key Kco received at the communication block 21. In step S79, the encryption block 24 encrypts, by a save key Ksave stored in the storage block 25 in advance, the content key Kco decrypted in step S78. In step S80, the memory controller 22 stores the encrypted content key Kco into the information storage block 42 as encrypted data 33. In step S81, the memory controller 22 stores the content encrypted by the content key Kco received at the communication block 21 in step S78 into the information storage block 42 as encrypted data 33. In step S82, the memory controller 22 stores information indicative of the storage locations of the content and the content key Kco into the data search table 31 and the information indicative of that the content and the content key Kco are encrypted into the identification information table 32.

Thus, the read/write device 1 compresses plaintext content received through the network, encrypts the compressed content, and stores the encrypted content into the IC memory 2.

Figure 6:
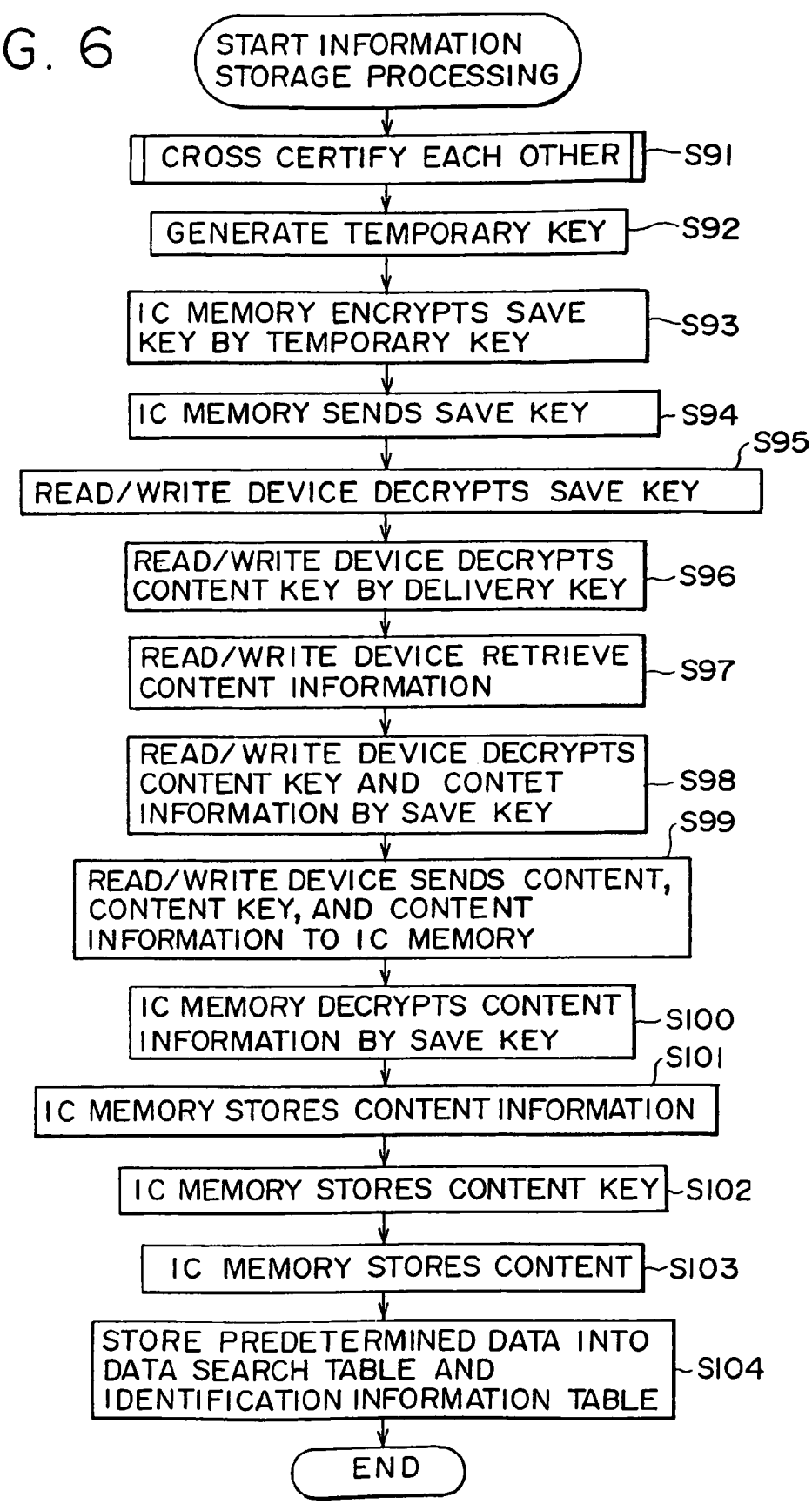
FIG. 6 is a flowchart describing another type of the processing for storing content received through network.

FIG. 6 is a flowchart describing the processing in which the read/write device 1 receives content encrypted by a content key Kco and the content key Kco encrypted by a delivery key Kd through the network, decrypts the content key Kco, encrypts again the content key Kco by a save key Ksave stored in the IC memory 2, and sends the content, the content key Kco, and predetermined information to the IC memory 2, which stores the content encrypted by the content key Kco, the content key Kco encrypted by the save key Ksave, and the predetermined information. In step S91 and step S92, the cross certification block 12 of the read/write device 1 cross-certifies the cross certification block 23 of the IC memory 2 and shares a temporary key Ktemp. The processing of the cross certification is generally the same as that described with reference to FIGS. 3 and 4, so that its details will be skipped. The shared temporary key Ktemp is stored in the storage block 15 and the storage block 25. In step S93, the encryption block 24 of the IC memory 2 encrypts a save key Ksave stored in the storage block 25 by the temporary key Ktemp. In step S94, the communication block 21 sends the encrypted save key Ksave to the communication block 11 of the read/write device 1, which receives the encrypted save key Ksave.

In step S95, the decryption block 14 of the read/write device 1 decrypts the save key Ksave received at the communication block 11 by the temporary key Ktemp. In step S96, the decryption block 14 decrypts the content key Kco received through the network by the delivery key Kd stored in the storage block 15. In step S97, the decryption block 14 decrypts the content information encrypted by the delivery key Kd, received along with the content key Kco through the network, and extracts the content information. It should be noted that the content information is content-associated information such as usage license information, billing information, and usage count information for example as described earlier. In step S98, the encryption block 13 encrypts the content key Kco decrypted in step S96 and the content information decrypted in step S97, by using the save key Ksave decrypted in step S95. In step S99, the communication block 11 sends the content encrypted by the content key Kco, the content key Kco encrypted by the save key Ksave, and the content information encrypted by the save key Ksave to the communication block 21 of the IC memory 2, which receives these items of information.

In step S100, the decryption block 26 of the IC memory 2 decrypts the content information encrypted by the save key Ksave and received at the communication block 21, by using the save key Ksave stored in the storage block 25. In step S101, the memory controller 22 stores the decrypted content information into the information storage block 42 as non-encrypted data 34. In step S102, the memory controller 22 stores the content key Kco encrypted by the save key Ksave and received in step S99 into the information storage block 42 as encrypted data 33. In step S103, the memory controller 22 stores the content encrypted by the content key Kco into the information storage block 42 as encrypted data 33. In step S104, the memory controller 22 stores information indicative of the storage locations of the content, the content key, and the content information into the data search table and the information indicative of whether each of these items of information is encrypted or not into the identification information table.

Thus, the read/write device 1 encrypts content and content-associated information by the save key Ksave stored in advance in the IC memory 2 and stores the encrypted content and content-associated information in the IC memory 2. In the above-mentioned example, the content information is encrypted by the save key Ksave to be sent to the IC memory. It will be apparent that the content information may also be encrypted by the temporary key Ktemp to be sent to the IC memory 2.

FIG. 7 is a flowchart describing the processing in which the read/write device 1 compresses plaintext content received through the network, encrypts the compressed content by a generated content key Kco, the content key Kco is encrypted by a save key Ksave stored in the IC memory 2, and sends the encrypted content and the encrypted content key Kco to the IC memory 2, which stores the received content encrypted by the content key Kco and the content key encrypted by the save key Ksave. In step S111 and step S112, the cross certification block 12 of the read/write device 1 cross-certifies the cross certification block 23 of the IC memory 2 and shares a temporary key Ktemp. The processing of this cross certification is generally the same as that described with reference to FIGS. 3 and 4, so that its details will be skipped. The shared temporary key is stored in the storage block 15 and the storage block 25. In step S113, the encryption block 24 of the IC memory 2 encrypts the save key Ksave stored in advance in the storage block 25 by the temporary key Ktemp. In step S114, the communication block 21 sends the save key Ksave encrypted by the temporary key Ktemp to the communication block 11 of the read/write device 1, which receives the save key Ksave encrypted by the temporary key Ktemp.

In step S115, the decryption block 14 decrypts, by the temporary key Ktemp, the save key Ksave received at the communication block 11. In step S116, the data compression block 17 compresses plaintext content by a predetermined compression scheme such as ATRAC. In step S117, the random number generator 16 generates a random number having a predetermined number of digits and supplies the generated random number to the encryption block 13. In step S118, the encryption block 13 encrypts, on the basis of a predetermined cryptographic scheme such as DES and by use of the content key Kco, the plaintext content received through the network. In step S119, the encryption block 13 encrypts the content key Kco by a save key Ksave. In step S120, the communication block 11 sends the content encrypted by the content key Kco and the content key Kco encrypted by the save key Ksave to the communication block 21 of the IC memory 2, which receives the content encrypted by the content key Kco and the content key Kco encrypted by the save key Ksave.

In step S121, the memory controller 22 stores the content key Kco encrypted by the save key Ksave and received at the communication block 21 into the information storage block 42 as encrypted data 33. In step S122, the memory controller 22 stores the content encrypted by the content key and received at the communication block 21 into the information storage block 42 as encrypted data 33. In step S123, the memory controller 22 stores the information indicative of the storage locations of the content and the content key Kco into the data search table 31 and the information indicative of that the content and the content key Kco are encrypted into the identification information table 32.

Thus, the read/write device 1 compresses plaintext content received through the network, encrypts the compressed content by the save key Ksave stored in the IC memory 2, and stores the encrypted content into the IC memory 2.

Figure 8:
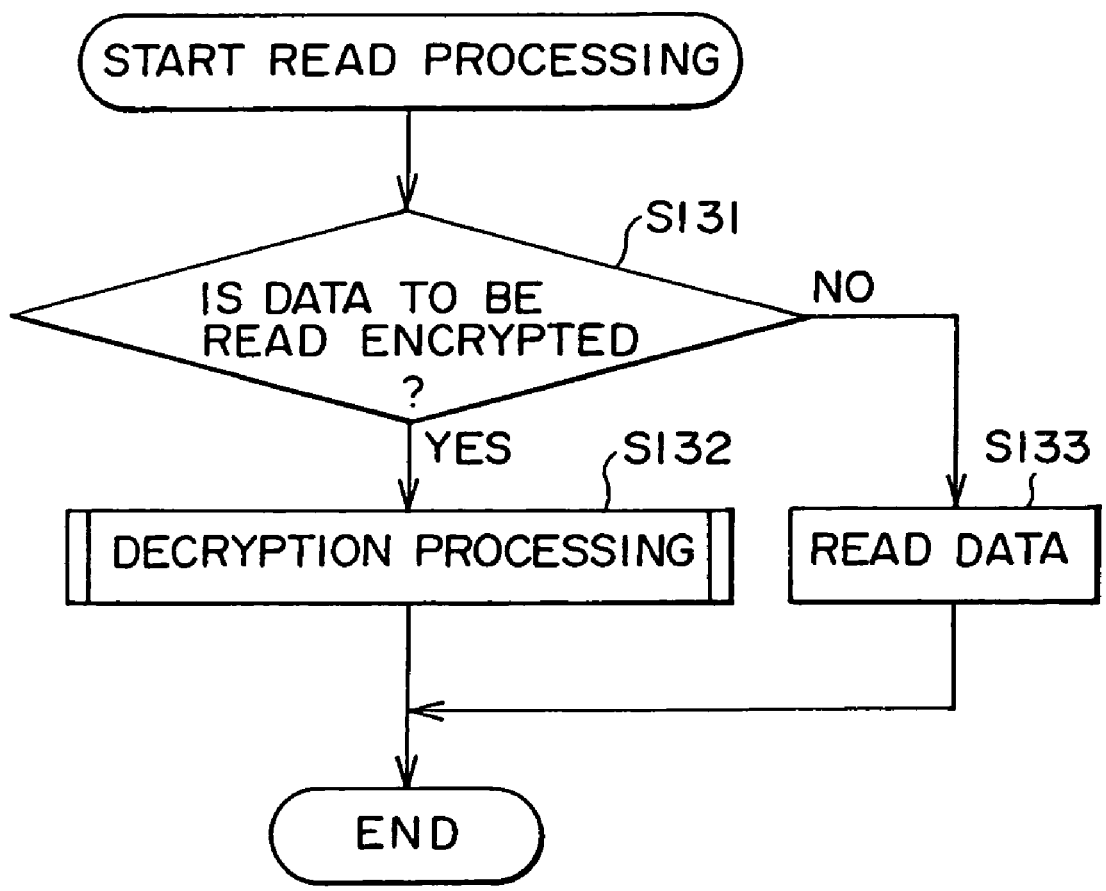
FIG. 8 is a flowchart describing the processing for reading data stored in an IC memory.

The following describes the processing in which content stored in the IC memory 2 is read. FIG. 8 is a flowchart describing this processing. In step S131, the memory controller 22 of the IC memory 2 determines whether the data to be read is encrypted or not from the data of the identification information table 32, if the data to be read is found encrypted, proceeds to step S132, the read/write device 1 and IC memory 2 execute the processing of the decryption, and then the processing comes to an end. The decryption processing of the step S132 will be described later with reference to flowcharts of FIGS. 9 and 10.

In step S131, if the data to be read is found not encrypted, the memory controller 22 reads the predetermined data from the information storage block 42 and sends the data to the communication block 11 of the read/write device 1 through the communication block 21, upon which the processing comes to an end.

Figure 9:
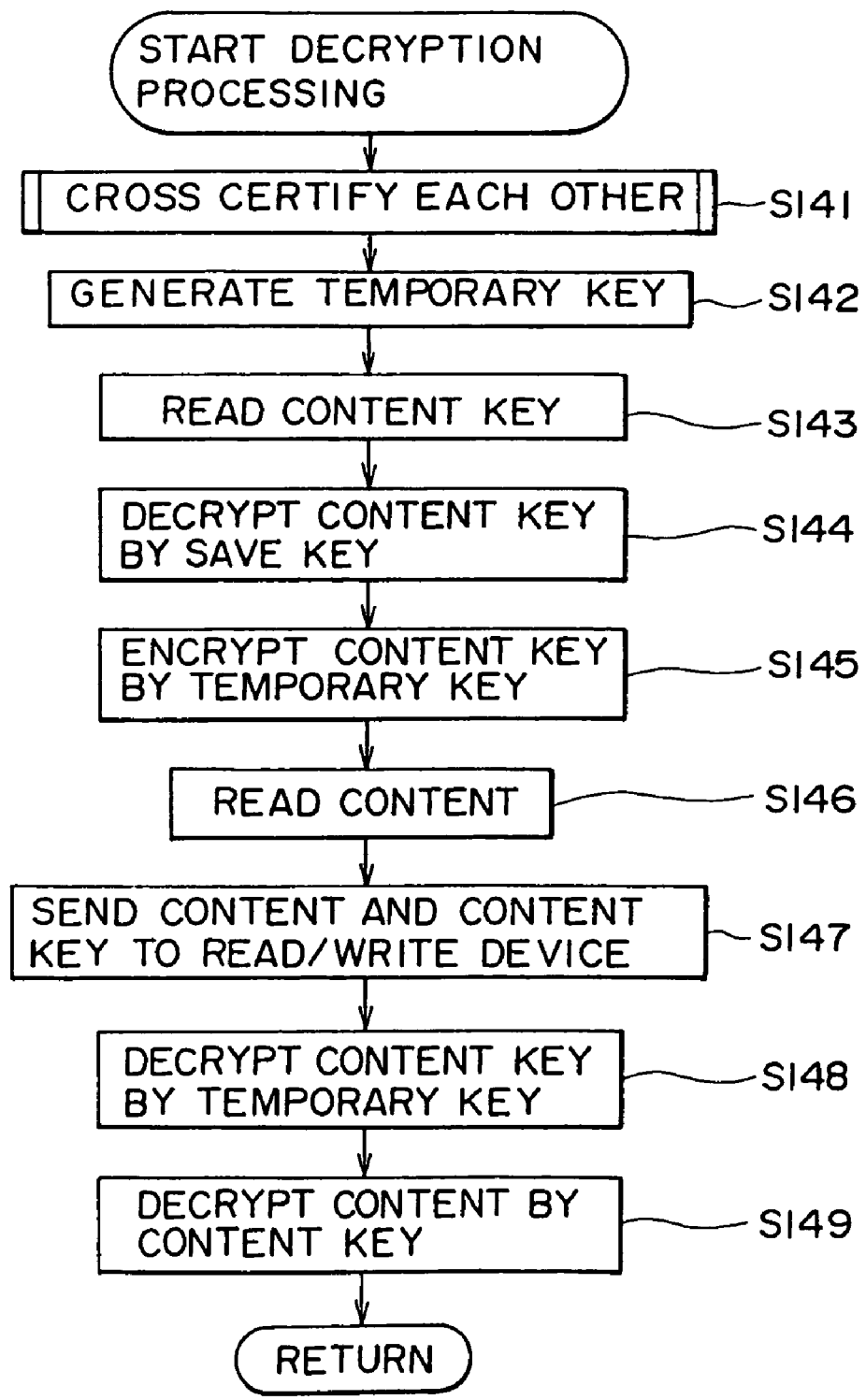
FIG. 9 is a flowchart describing the processing of decryption.

FIG. 9 is a flowchart describing the decryption processing for the processing of step S132 of FIG. 8. In step S141 and step S142, the cross certification block 12 of the read/write device 1 cross-certifies the cross certification block 23 of the IC memory 2 and shares a temporary key Ktemp. The processing of this cross certification is generally the same as that described with reference to FIGS. 3 and 4, therefore its details will be skipped. The shared temporary key Ktemp is stored in the storage block 15 and the storage block 25. In step S143, the memory controller 22 references the table search table to read a content key Kco encrypted by a save key Ksave from the information storage block 42. In step S144, the decryption block 26 decrypts, by use of the save key Ksave stored in the storage block 25, the content key Kco encrypted by the save key Ksave.

In step S145, the encryption block 24 encrypts the decrypted content key Kco by the temporary key Ktemp generated in step S142. In step S146, the memory controller 22 references the data search table to read the content encrypted by the content key Kco from the information storage block 42. In step S147, the communication block 21 sends the content encrypted by the content key Kco and the content key Kco encrypted by the temporary key Ktemp to the communication block 11 of the read/write device 1, which receives the content encrypted by the content key Kco and the content key Kco encrypted by the temporary key Ktemp.

In step S148, the decryption block 14 of the read/write device 1 decrypts, by use of the temporary key Ktemp generated in step S142, the content key Kco received at the communication block 11. In step S149, the decryption block 14 decrypts the content by the content key Kco.

Thus, the read/write device 1 decrypts the encrypted content stored in the IC memory 2.

Figure 10:
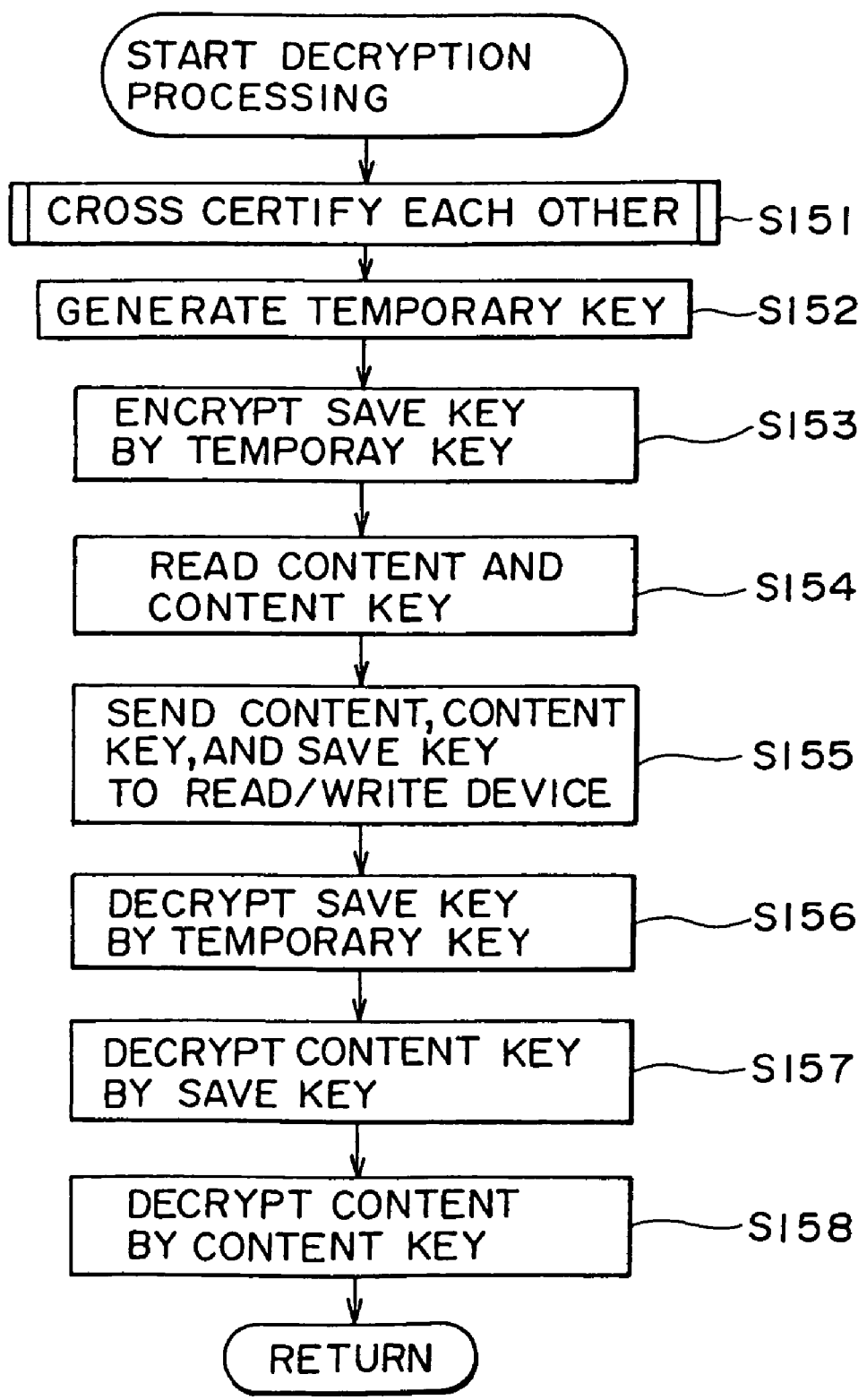
FIG. 10 is a flowchart describing another type of the processing of decryption.

FIG. 10 is flowchart describing another type of the decryption processing for the processing described in step S132 of FIG. 8. The processing operations of step S151 and step S152 are generally the same as those of step S141 and step S142 of FIG. 9, so that their descriptions will be skipped. In step S153, the encryption block 24 encrypts the save key Ksave stored in the storage block 25 by use of a temporary key Ktemp. In step S154, the memory controller 22 references the data search table to read the content key Kco encrypted by the save key Ksave and the content encrypted by the content key Kco from the information storage block 42. In step S155, the communication block 21 sends the save key Ksave encrypted by the temporary key Ktemp, the content key Kco encrypted by the save key Ksave, and the content encrypted by the content key Kco to the communication block 11, which receives these items of data.

In step S156, the decryption block 14 of the read/write device 1 decrypts, by use of the temporary key Ktemp stored in the storage block 15, the save key Ksave encrypted by the temporary key Ktemp and received in step S155. In step S157, the decryption block 14 decrypts, by use of the save key Ksave, the content key Kco encrypted by the save key Ksave and received in step S155. In step S158, the decryption block 14 decrypts, by use of the content key Kco, the content encrypted by the content key Kco received in step S155.

Thus, the read/write device 1 decrypts, by use of the save key Ksave stored in the IC memory 2, the content stored in the IC memory 2.

As described above, the content key Kco is encrypted by a save key Ksave which is different for a different IC memory 2, thereby preventing unauthorized replication from being practiced. In addition, the content is stored in the general-purpose memory, so that the IC memory 2 can be provided at a low cost.

In the above-mentioned examples, common key cryptography has been described as DES, which is a block cryptography. It will be apparent that public key cryptography may also be FEAL, IDEA (International Data Encryption Algorithm) proposed by NTT (trademark) or a stream cryptography in which encryption is performed in units of 1 to several bits.

In the above-mentioned examples, encryption of content and content key Kco is performed by use of common key cryptography. It will be apparent that the encryption may also be performed by use of public key cryptography.

It should be noted that the system herein denotes an entire apparatus composed of a plurality of devices.

A medium for providing users with a computer program for executing the above-mentioned processing may include recording media such as a magnetic disc, a CD-ROM, an optical disc such as a DVD, a solid memory and communication media such as a network and a satellite.

As described and according to the invention, there are provided an information processing apparatus, an information processing method, an information providing medium, an information decryption apparatus, and an information storage medium that prevent unauthorized replication of information by use of a low-cost general-purpose semiconductor memory.

While the preferred embodiments of the present invention have been described using specific terms, such description is for illustrative purposes only, and it is to be understood that changes and variations may be made without departing from the spirit or scope of the appended claims.

What is claimed is:

1. A decryption apparatus for receiving a content key from a storage medium and decrypting a content encrypted by the content key, the decryption apparatus comprising:

mutual authentication means for executing mutual authentication with the storage medium and generating a session key for sharing with the storage medium;

first receiving means for receiving a storage key encrypted by the session key from the storage medium;

first decryption means for decrypting the storage key by the session key;

second receiving means for receiving the content key encrypted by the storage key from the storage medium;

second decryption means for decrypting the content key by the storage key; and third decryption means for decrypting the content by the content key.

2. The decryption apparatus according to claim 1, wherein the storage medium further comprises second storing means for storing the content;

wherein the third decryption means reads the content from the storage medium; and wherein the third decryption means decrypts the content after reading all of the content or decrypts the content after reading a portion of the content repeatedly.

3. The decryption apparatus according to claim 2, wherein the decryption apparatus further comprises content decoding means for decoding the decrypted content.

4. A storage medium for storing a content key and for sending the content key to an information processing apparatus, the storage medium comprising:

storing means for storing a storage key for decrypting the content key;

mutual authentication means for executing mutual authentication with the information processing apparatus and generating a session key for sharing with the information processing apparatus;

encryption means for encrypting the stored storage key by the session key; and sending means for sending the encrypted storage key to the information processing apparatus.

5. The storage medium according to claim 4, wherein the storage medium further comprises:

second storing means for storing the content encrypted by the content key; and second sending means for sending the stored content to the information processing apparatus.

6. The storage medium according to claim 4, wherein the storage key comprises a unique value for each storage medium.

7. The storage medium according to claim 4, wherein the storage medium further comprises third storing means for storing an information which is not encrypted.

8. The storage medium of claim 7, wherein the mutual authentication means does not execute mutual authentication when reading the information which is not encrypted.

9. The storage medium according to claim 4, wherein the first storing means is tamper proof.

10. A storage medium for receiving an encrypted content key from an information processing apparatus and for storing the encrypted content key, the storage medium comprising:

first storing means for storing a storage key for encrypting the content key;

mutual authentication means for executing mutual authentication with the information processing apparatus and generating a session key for sharing with the information processing apparatus;
receiving means for receiving the content key encrypted by the session key from the information processing apparatus;
decryption means for decrypting the received content key by the session key;
encryption means for encrypting the decrypted content key by the storage key; and
second storing means for storing the content key encrypted by the storage key.

11. The storage medium according to claim 10, further comprising:
second receiving means for receiving content encrypted by the content key from the information processing apparatus; and
third storing means for storing the content encrypted by the content key.

12. A storage medium for storing a content key and for sending the content key to an information processing apparatus, the storage medium comprising:
storing means for storing a storage key for decrypting the content key;
mutual authentication means for executing mutual authentication with the information processing apparatus and generating a session key for sharing with the information processing apparatus;
decryption means for decrypting the content key by the storage key;
encryption means for encrypting the decrypted content key by the session key; and
sending means for sending the content key encrypted by the session key to the information processing apparatus.

13. The storage medium according to claim 12, further comprising:
second storing means for storing the content encrypted by the content key; and
second sending means for sending the content encrypted by the content key to the information processing apparatus.

14. The storage medium according to claim 13, wherein the storage key comprises a unique value for each storage medium.

15. The storage medium according to claim 13, wherein the storage medium further comprises third storing means for storing information which is not encrypted.

16. The storage medium according to claim 15, wherein the mutual authentication means does not execute mutual authentication when reading the information which is not encrypted.

17. The storage medium according to claim 13, wherein the first storing means is tamper proof.

18. A method for receiving, by a decryption apparatus, a content key from a storage medium and decrypting a content encrypted by the content key, comprising:
executing mutual authentication between the decryption apparatus and the storage medium;
generating a session key for sharing between the decryption apparatus and the storage medium;
receiving a storage key encrypted by the session key from the storage medium;
decrypting the storage key by the session key;
receiving the content key encrypted by the storage key from the storage medium;
decrypting the content key by the storage key; and
decrypting the content by the content key.

19. The method of claim 18, further comprising:
storing the content in the storage medium;
reading the content from the storage medium; and
decrypting the content after reading all of the content or decrypting the content after reading a portion of the content repeatedly.

20. The method according to claim 19, further comprising decoding the decrypted content.

21. A method for storing, in a storage medium, a content key and for sending the content key from the storage medium to an information processing apparatus, comprising:
storing a storage key for decrypting the content key;
executing mutual authentication between the storage medium and the information processing apparatus;
generating a session key for sharing between the storage medium and the information processing apparatus;
encrypting the stored storage key by the session key; and
sending the encrypted storage key to the information processing apparatus.

22. The method of claim 21, further comprising:
storing the content encrypted by the content key; and
sending the stored content to the information processing apparatus.

23. The method according to claim 21, further comprising creating a unique storage key for each storage medium.

24. The method according to claim 21, further comprising storing an information which is not encrypted.

25. The method according to claim 24, further comprising not executing mutual authentication when reading the information which is not encrypted.

26. The method according to claim 21, wherein storage for storing the storage key is tamper proof.

27. A method for receiving, by a storage medium, an encrypted content key from an information processing apparatus and for storing the encrypted content key, comprising:
storing, in the storage medium, a storage key for encrypting the content key;
executing mutual authentication between the storage medium and the information processing apparatus;
generating a session key for sharing between the storage medium and the information processing apparatus;
receiving the content key encrypted by the session key from the information processing apparatus;
decrypting the received content key by the session key;
encrypting the decrypted content key by the storage key; and
storing the content key encrypted by the storage key.

28. The method of claim 27, further comprising:
receiving content encrypted by the content key from the information processing apparatus; and
storing the content encrypted by the content key.

29. A method for storing, in a storage medium, a content key and for sending the content key to an information processing apparatus, comprising:
storing a storage key for decrypting the content key;
executing mutual authentication between the storage medium and the information processing apparatus;
generating a session key for sharing between the storage medium and the information processing apparatus;
decrypting the content key by the storage key;
encrypting the decrypted content key by the session key; and
sending the content key encrypted by the session key to the information processing apparatus.

30. The method according to claim 29, further comprising:
storing the content encrypted by the content key; and
sending the content encrypted by the content key to the information processing apparatus.

31. The method according to claim 30, further comprising creating a unique storage key for each storage medium.

32. The method according to claim 30, further comprising storing information which is not encrypted.

33. The method according to claim 32, further comprising not executing mutual authentication when reading the information which is not encrypted.

34. The method according to claim 30, wherein storage for storing the storage key is tamper proof.

35. A method for storing, by a storage medium, an encrypted content key sent from a storage apparatus, comprising:
   storing a save key encrypting the content key;
   executing mutual authentication between the storage medium and the storage apparatus;
   generating a temporary key for sharing between the storage medium and the storage apparatus;
   encrypting the save key by the temporary key;
   sending the save key encrypted by the temporary key to the storage apparatus;
   receiving the content key encrypted by the save key from the storage apparatus; and
   storing the received content key.

36. The method of claim 35, further comprising:
   receiving the content encrypted by the content key from the storage apparatus; and
   storing the received content encrypted by the content key.

37. A method for encrypting, by a storage apparatus, a content by a content key and for storing at least the content key into a storage medium, comprising:
   executing mutual authentication between the storage apparatus and the storage medium;
   generating a temporary key for sharing between the storage apparatus and the storage medium;
   encrypting the content key by the temporary key; and
   sending at least the encrypted content key by the temporary key to the storage medium.

38. The method according to claim 37, further comprising:
   storing a distribution key for decrypting the content key;
   decrypting the encrypted content key by the distribution key to form a decrypted content key; and
   encrypting the decrypted content key by the temporary key.

39. The method according to claim 37, wherein the temporary key encrypts the content encrypted by the content key, usage license information, billing information, or usage count information.

40. A method for generating, by a storage apparatus, a content key and encrypting a content by the content key and for storing the content key to a storage medium, comprising:
   generating the content key;
   encrypting the content by the content key;
   executing mutual authentication between the storage apparatus and the storage medium;
   generating a temporary key for sharing between the storage apparatus and the storage medium;
   encrypting the content key by the temporary key; and
   sending the content key encrypted by the temporary key to the storage medium.

41. The method of claim 40, further comprising:
   encoding the content; and
   encrypting the encoded content by the content key.

42. The method of claim 41, further comprising
   acquiring the content from a storage medium or through a network; and
   encoding the acquired content.

43. The method of claim 41, further comprising:
   storing the encrypted content by the content key; and
   associating the content with the content key.

44. A method for receiving, by a decryption apparatus, a content key from a storage medium storing the content key and for decrypting the content encrypted by the content key, comprising:
   executing mutual authentication between the decryption apparatus and the storage medium;
   generating a temporary key for sharing between the decryption apparatus and the storage medium;
   receiving the content key encrypted by the temporary key from the storage medium;
   decrypting the content key by the temporary key; and
   decrypting the content by the content key.

45. The method of claim 44, further comprising:
   storing the content; and
   wherein decrypting the content by the content key comprises reading the content from the storage medium and decrypting the content after reading all of the content or decrypting the content after reading a portion of the content repeatedly.

46. The method of claim 44, further comprising decoding the decrypted content.

47. A method for storing, in a first storage medium, an encrypted content key sent from a second storage medium, comprising:
   storing a save key encrypting the content key;
   executing mutual authentication between the first storage medium and the second storage medium;
   generating a temporary key for sharing between the first storage medium and the second storage medium;
   receiving, at the first storage medium, the content key encrypted by the temporary key from the second storage medium;
   decrypting the received content key by the temporary key;
   encrypting the decrypted content key by the save key; and
   storing the content key encrypted by the save key.

48. The method of claim 47, further comprising:
   receiving the content encrypted by the content key from the second storage medium; and
   storing the received content encrypted by the content key.

49. A method for storing, at a first storage medium, a content key and for sending the content key to a second storage medium, comprising:
   storing a save key decrypting the content key;
   executing mutual authentication between the first storage medium and the second storage medium;
   generating a temporary key for sharing with the first storage medium;
   decrypting the content key by the save key;
   encrypting the decrypted content key by the temporary key; and
   sending, from the first storage medium, the content key encrypted by the temporary key to the second storage medium.

50. The method of claim 49, further comprising:
   storing the content encrypted by the content key; and
   sending, from the first storage medium, the stored content to the second storage medium.

51. The method according to claim 49, wherein the save key has a different value for every storage medium.

52. The method according to claim 49, further comprising storing information which is not encrypted.

53. The method according to claim 52, further comprising not executing mutual authentication when reading the information which is not encrypted.

54. The method of claim 49, wherein storage for storing the save key decrypting the content key is tamper proof.

* * * * *